United States Patent
Straus et al.

(10) Patent No.: US 7,211,282 B2
(45) Date of Patent: May 1, 2007

(54) PINWHEEL LOLLIPOP

(76) Inventors: Adam D. Straus, 26 Palmer Ave., Sleepy Hollow, NY (US) 10591; Roberta B. Straus, 26 Palmer Ave., Sleepy Hollow, NY (US) 10591

( * ) Notice: Subject to any disclaimer, the term of this patent is extended or adjusted under 35 U.S.C. 154(b) by 470 days.

(21) Appl. No.: 10/673,800

(22) Filed: Sep. 29, 2003

(65) Prior Publication Data

US 2005/0069609 A1    Mar. 31, 2005

(51) Int. Cl.
*A23G 1/00*   (2006.01)
*A63H 33/40*  (2006.01)

(52) U.S. Cl. ................ 426/91; 426/104; 426/132; 426/134; 446/386

(58) Field of Classification Search ............... 426/104, 426/134, 91, 132; 446/386, 217, 218, 236; 294/1.1, 5.5; D1/104, 106, 127, 130
See application file for complete search history.

(56) References Cited

U.S. PATENT DOCUMENTS

| | | | | |
|---|---|---|---|---|
| 1,769,784 A | * | 7/1930 | Hoppe | 446/217 |
| 2,091,389 A | * | 8/1937 | Exline et al. | 40/479 |
| 3,140,954 A | * | 7/1964 | Schroeder | 426/104 |
| D246,207 S | * | 11/1977 | Dee | D1/104 |
| 4,758,197 A | * | 7/1988 | Lee | 446/213 |
| 5,536,054 A | * | 7/1996 | Liaw | 294/1.1 |
| 5,690,535 A | * | 11/1997 | Coleman et al. | 446/236 |
| 6,221,409 B1 | * | 4/2001 | Bueno Ceresuela | 426/104 |
| 6,402,580 B1 | * | 6/2002 | Coleman et al. | 446/72 |
| 6,416,800 B1 | * | 7/2002 | Weber et al. | 426/104 |
| 6,530,816 B1 | * | 3/2003 | Chiu | 446/217 |
| 2003/0068412 A1 | * | 4/2003 | Coleman et al. | 426/134 |

* cited by examiner

*Primary Examiner*—Reginald L. Alexander
(74) *Attorney, Agent, or Firm*—Keusey, Tutunjian & Bitetto, P.C.

(57) ABSTRACT

A pinwheel includes a first axis, which supports a hub. A plurality of protrusions is connected to the hub and radially extending from the hub. Candy items are attached to a plurality of the protrusions. The candy items may include a plurality of different flavors or colors to concurrently provide a user with a variety of flavors to taste.

26 Claims, 14 Drawing Sheets

PINWHEEL LOLLIPOP

FIELD OF THE INVENTION

The present invention generally relates to novelty items and, more particularly, to a pinwheel apparatus having a plurality of candy portions which rotate thereon.

BACKGROUND OF THE INVENTION

It is well known to form lollipops on sticks. These sticks are sometimes inserted into a motion device or shaker, which moves the lollipop when activated. Most lollipops are of a single flavor or may include layers of different flavors. These flavors are not available at the same time however.

It would be advantageous to provide a novel apparatus for selecting a flavor of a candy item and enjoy a plurality of flavors at the same time.

SUMMARY OF THE INVENTION

A pinwheel includes a first axis, which supports a hub. A plurality of protrusions is connected to the hub and radially extending from the hub. Candy items are attached to a plurality of the protrusions. The candy items may include a plurality of different flavors or colors to concurrently provide a user with a variety of flavors to taste. In addition, the confection/food may include different types on a same pinwheel portion each may include one or more of pressed dextrose, lollipop, caramel, taffy, licorice, chocolate or even sculpted and sculpted/molded items.

In other embodiments, the hub is formed into a figure or promotional item. The hub may also include a detachable figure or promotional item. The first axis may be provided by an axel connected to a platform to permit rotation about the first axis. The pinwheel may further include a light connected to the platform for illuminating the hub and the candy items. A flashlight may also be connected to the device. The protrusions preferably form blades, which spin the hub when the blades are placed in an air stream. The pinwheel may further include a ratchet mechanism, which holds the hub in a position, or a motor for spinning the hub. The pinwheel may further include a finger driven mechanism for spinning the hub.

The pinwheel may include an illumination feature on one of the hub and the protrusions to provide a light effect. The illumination feature may include one of a light and a reflector. The pinwheel may further include a sound device, which plays sounds or music in accordance with motion of the hub, or simply plays music when activated. The candy item may include a lollipop. The protrusions may include candy items having different flavors or colors. The protrusions may include adjustable fan blades to permit a change in an angle relative to a central axis of a respective blade. The protrusions may include spokes.

Another embodiment of the present invention includes a pinwheel lollipop, including a hub having a plurality of spokes extending radially therefrom, each spoke comprising a candy item molded thereon. The spokes form blades for diverting air in an air stream such that when placed in an air stream the hub, spokes and candy items rotate about an axis. Other embodiments may include combinations of features and structures as outlined herein.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

The present invention includes amusement devices, and in particular pinwheel lollipops. In one embodiment, the present invention includes a pinwheel having a plurality of spokes. Each spoke terminates in an end portion. Each end portion is configured to have a lollipop, or other candy or food disposed thereon. In a preferred embodiment, each spoke include a candy item of a different flavor and/or color. The spokes of the pinwheel are rotatably connected to a stick or handle, which can be held by a user and employed to secure the device when pinwheel is rotated. Other embodiments are also contemplated and will be illustratively described hereinafter.

It is to be understood that the present invention is described in terms of a pinwheel lollipop; however, the present invention is much broader and may include rotatable device having a plurality of candy or food thereon.

Figure 1:
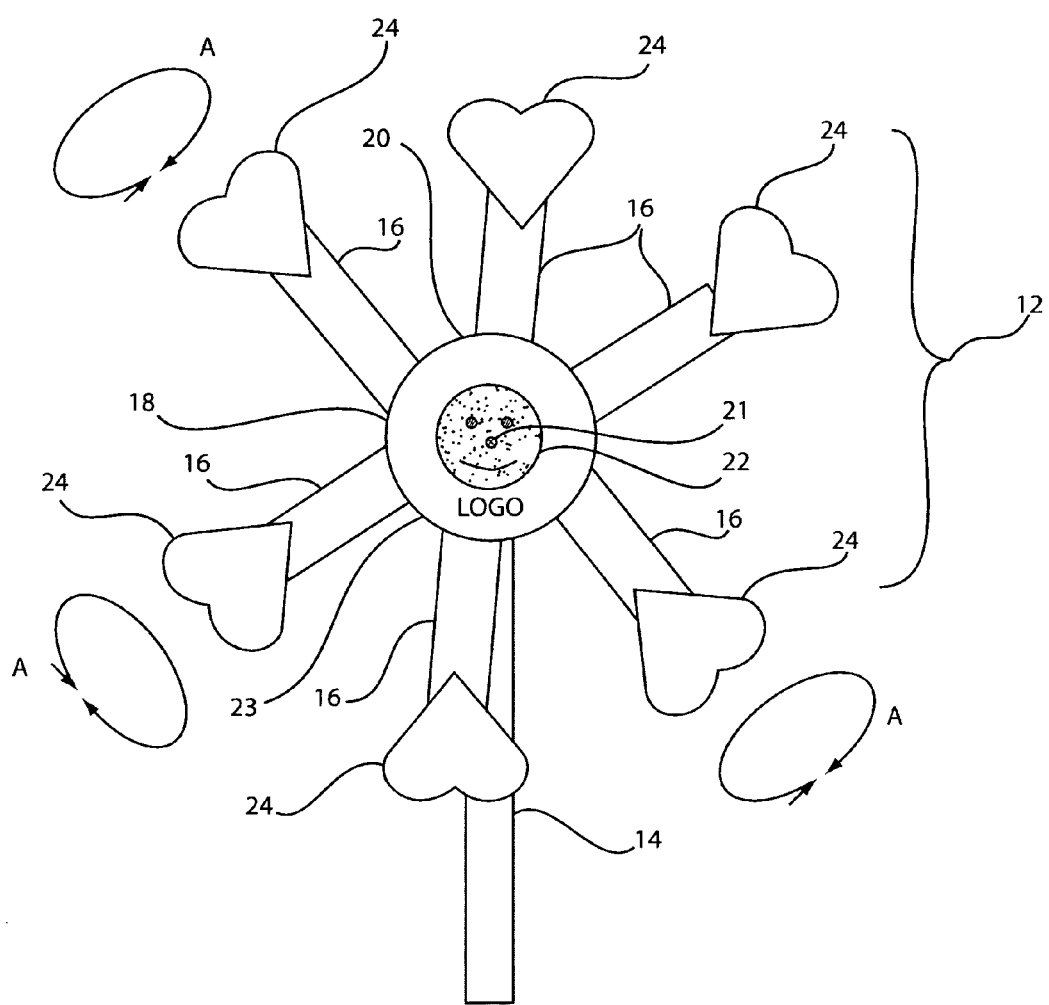
FIG. 1 is an exemplary embodiment showing a pinwheel having advertising information and candy items thereon in accordance with the present invention.

Referring now in specific detail to the drawings in which like reference numerals identify similar or identical elements throughout the several views, and initially to FIG. 1, an amusement device 10 is illustratively shown in accordance with one embodiment of the present invention. Device 10 includes a pinwheel portion 12, which is rotatably coupled to a platform or stick 14. It is noted that platform or stick 14 (or 30) may include other forms, such as, for example, a ring, bracelet or other type platform. Parts of pinwheel portion 12 may include a molded plastic, wood, paper material or any other material capable of being formed into a predetermined shape. Pinwheel portion 12 may include one or more spokes or fins 16. Fins/spokes 16 may take any shape or form and preferably extend radially outwardly from a central hub 18.

Hub 18 may be a simple ring with a hole or include a surrounding area 20, which may be formed into an image, say, for example, a face or image of a superhero, villain or some other character or image. Surrounding area 20 may include a detachable portion 22, such as a pin, a charm, a ring or some other novelty item or promotional item. Surrounding area 20 or hub 18 may further include a nameplate or promotional or advertising information 23, such as for example, a company name or address, a trademark or logo or other text or characters as the case may be.

Hub 18 connects to an axel 21, which in turn is fixed to a stem or shaft 14. Hub 18 rotates about axel 21 to provide a visual effect, novelty and permit changing of positions candy items 24.

In one embodiment, fins 16 may have an inclined/declined orientation relative their central axis and can be rotated in the direction of arrow A for each blade 16. In this way, blades 16 act as fan blades or vanes, such that is introduced into an air stream the pinwheel portion 12 with spin. Spokes/fins 16 may be colored or decorated in a plurality of ways to provide a visual effect when the pinwheel portion 12 is in motion, e.g., a swirling effect or concentric colored circles, etc. In one embodiment, spokes 16 may be adjustable about their central axis to permit adjustment of the fan blade angle. In this way, a user may be capable of adjusting the speed of rotation of the pinwheel portion 12.

One or more spokes 16 of the pinwheel portion 12 may include a candy or food item 24 thereon. In one embodiment, hard candy 24 is molded onto an end portion of each spoke 16. Candy 24 may be shaped in a plurality of different shapes and/or colors to provide a user with many flavors or a variety of tastes.

Figure 2:
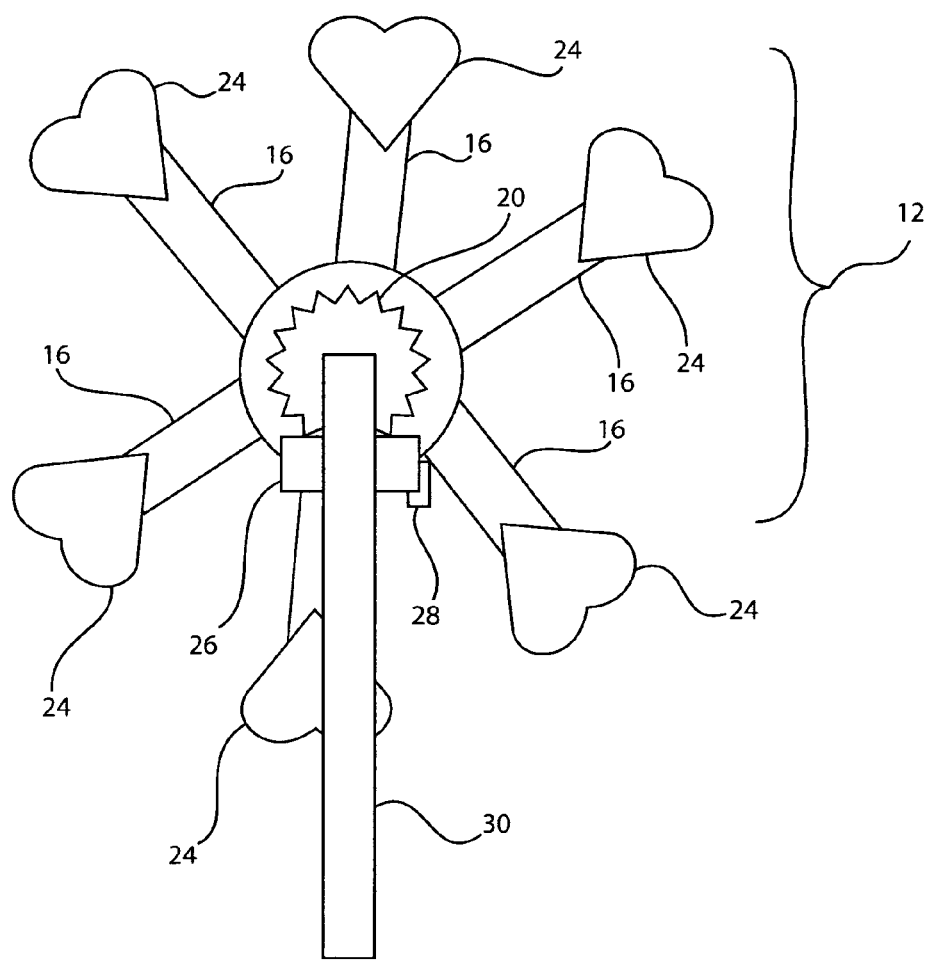
FIG. 2 is an exemplary embodiment showing a pinwheel having a ratchet mechanism for controlling motion of the pinwheel portion in accordance with the present invention.

Referring to FIG. 2, another embodiment of the present invention is illustratively shown. Pinwheel portion 12 includes a ratchet mechanism 26. Ratchet mechanism 26 includes a release 28. When release 28 is in an intermediary position, pinwheel portion is permitted to rotate to a next spoke position but then snaps into the next spoke position. This can be achieved by providing a frangible portion (not shown), which may deflect to permit gear teeth 29 to pass over it. When release 28 is engaged the frangible portion no longer permits gear teeth 29 to pass over it and instead blocks rotation of pinwheel portion 12.

In this way, candy 24 at say the upright position can be eaten. Pinwheel portion 12 may then be rotated to a next position by first overcoming the resistance provided by the engaged release 28. When release 28 is disengaged, pinwheel portion 12 can rotate freely relative to stick or platform 30. Ratchet mechanism 26 may provide a sound effect, for example, when a next position is reached while release 28 is in the intermediate position.

Figure 3:
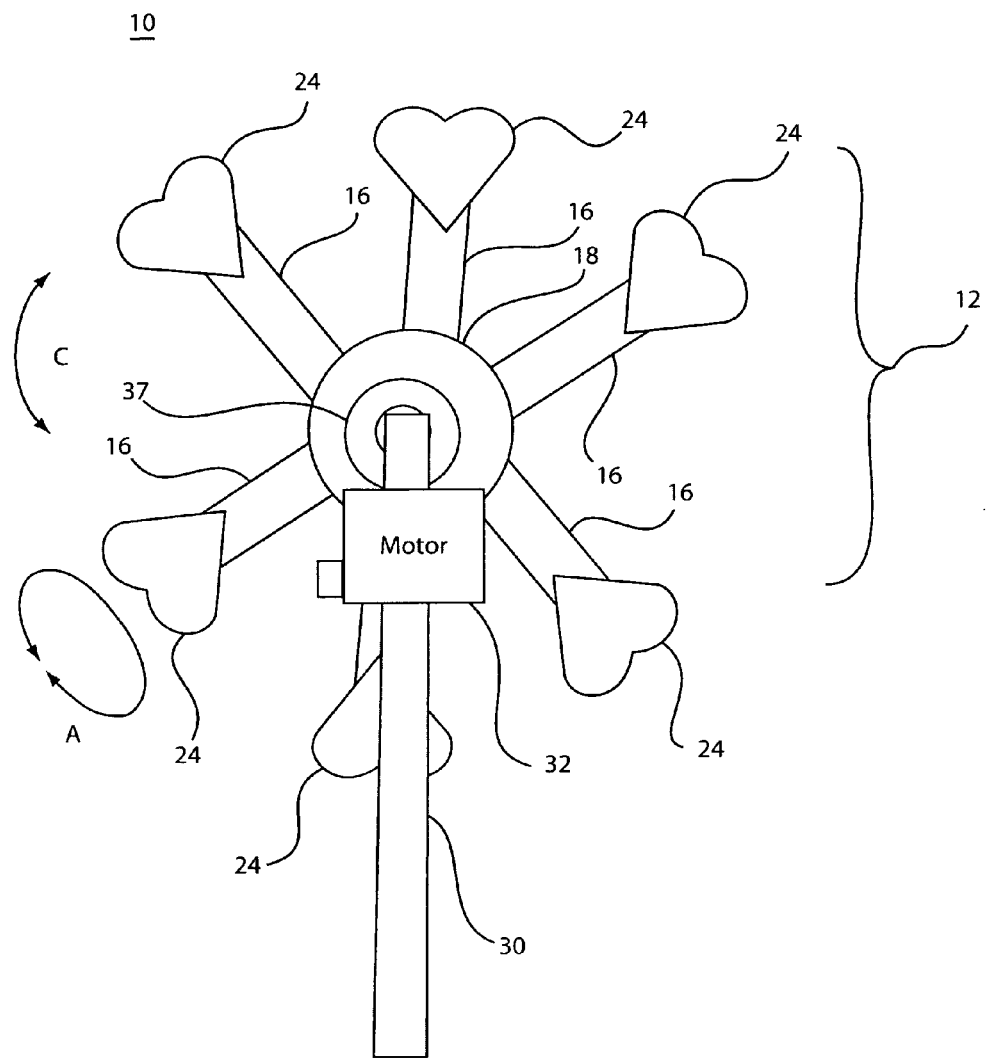
FIG. 3 is an exemplary embodiment showing a motor for rotating the pinwheel portion in accordance with the present invention.
Figure 4:
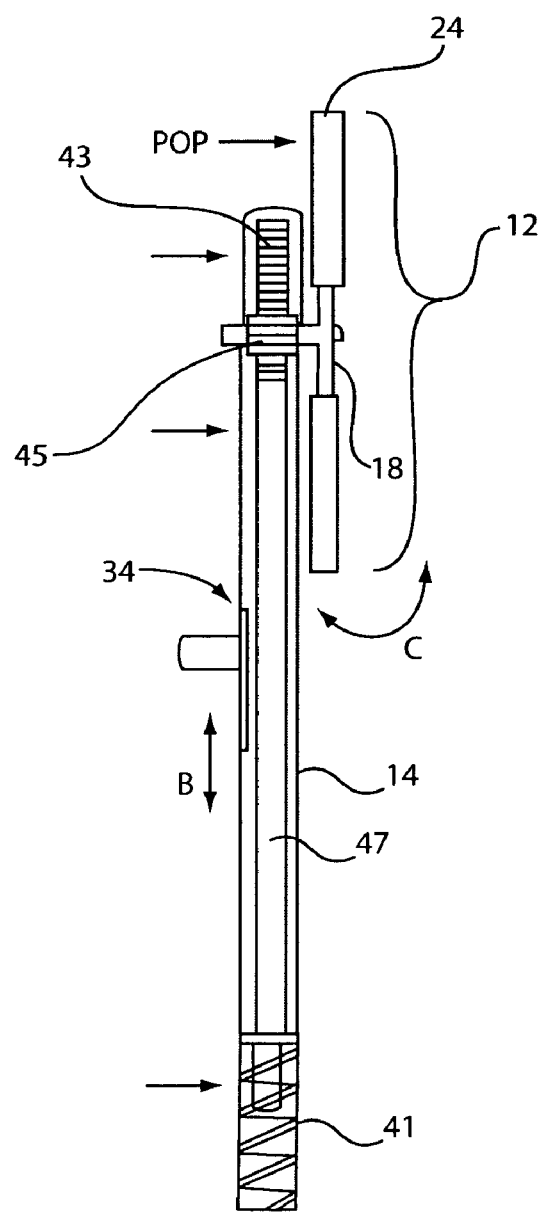
FIG. 4 is an exemplary embodiment showing a finger driven device for rotating the pinwheel portion in accordance with the present invention.

Referring to FIGS. 3 and 4, platform 30 may include a motor 32 (FIG. 3) or a finger driven mechanism 34 (FIG. 4) to make pinwheel portion 12 spin. Motor 32 may include a simple battery operated device with a drive shaft gear that engages a gear 37 on hub 18 to provide rotation of pinwheel portion 12. Finger driven mechanism 34 may include a spring 41, which biases a rack 43 to return after spinning a pinion 45. The pinion 45 would be attached to hub 18 or an axel connected to hub 18, and the rack 43 could be pumped in the direction of arrow "B" to cause a spinning action when advanced and be released on the biased return of rack 43 to its initial position (using e.g., a one way clutch). This causes the rotational motion as indicated by arrow "C". Rack 43 is connected or attached on the end of a rod 47, a knob or extension 49 is connected to rod 47 to permit finger-imparted motion to pinwheel portion 12. Finger mechanism 34 may be provided in stick 14 or external to stick 14.

Figure 5:
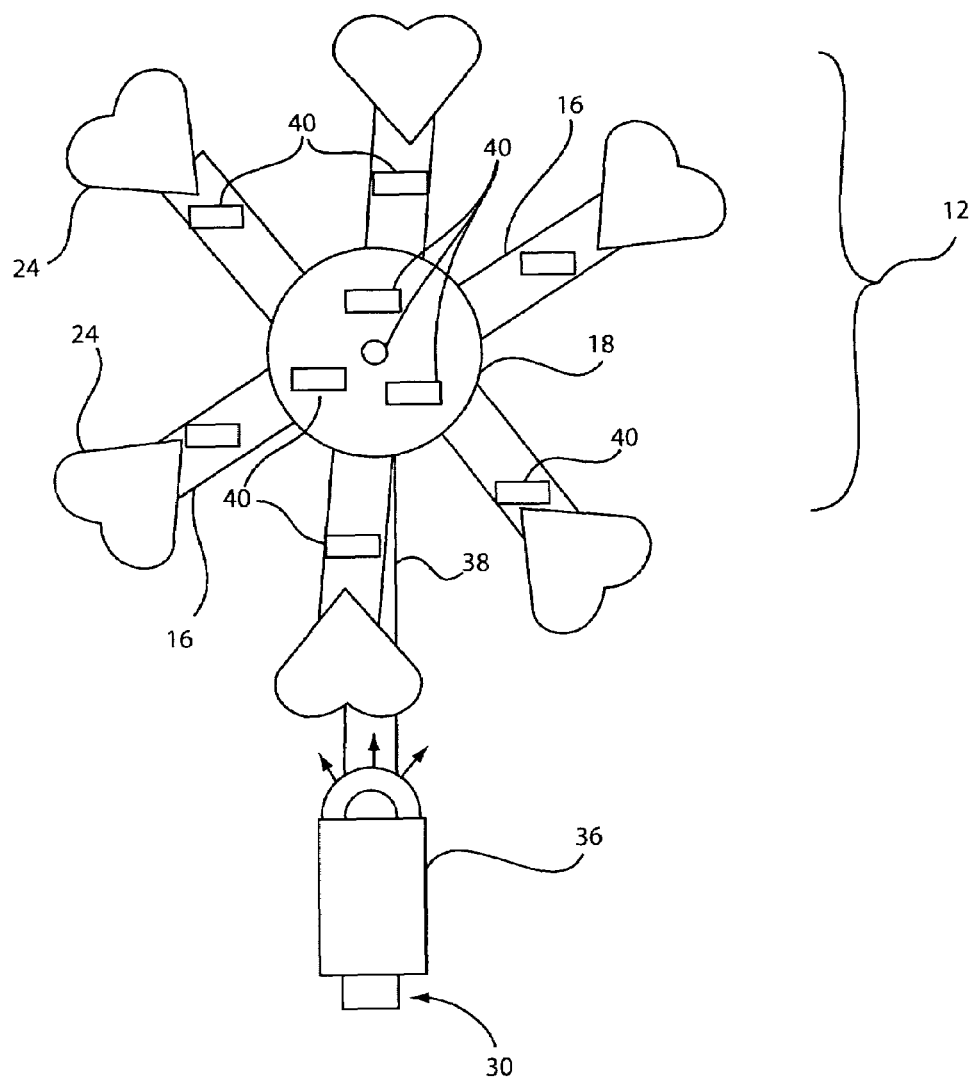
FIG. 5 is an exemplary embodiment showing a pinwheel having lights elements in accordance with the present invention.

Referring to FIG. 5, platform 30 may further include one or more lights 36, which may be employed to illuminate pinwheel portion 12, or may be employed as a flashlight. Lights 36 may be employed on a stem 38 or may be disposed on the pinwheel portion 12. In one embodiment, light elements 40, such as for example, light emitting diodes or reflectors 40 are provided on spokes 16 or on hub 18 to provide a lighted effect especially when pinwheel portion 12 is in motion. A battery and switch may be located on hub 18 to illuminate or animate LEDs 40 or other light sources on pinwheel portion 12. In another embodiment, reflectors 40 may be included on pinwheel portion 12. Reflectors 40 may be used independently of lights sources, or may be used in conjunction with light sources to provide a plurality of different light effects.

Figure 6:
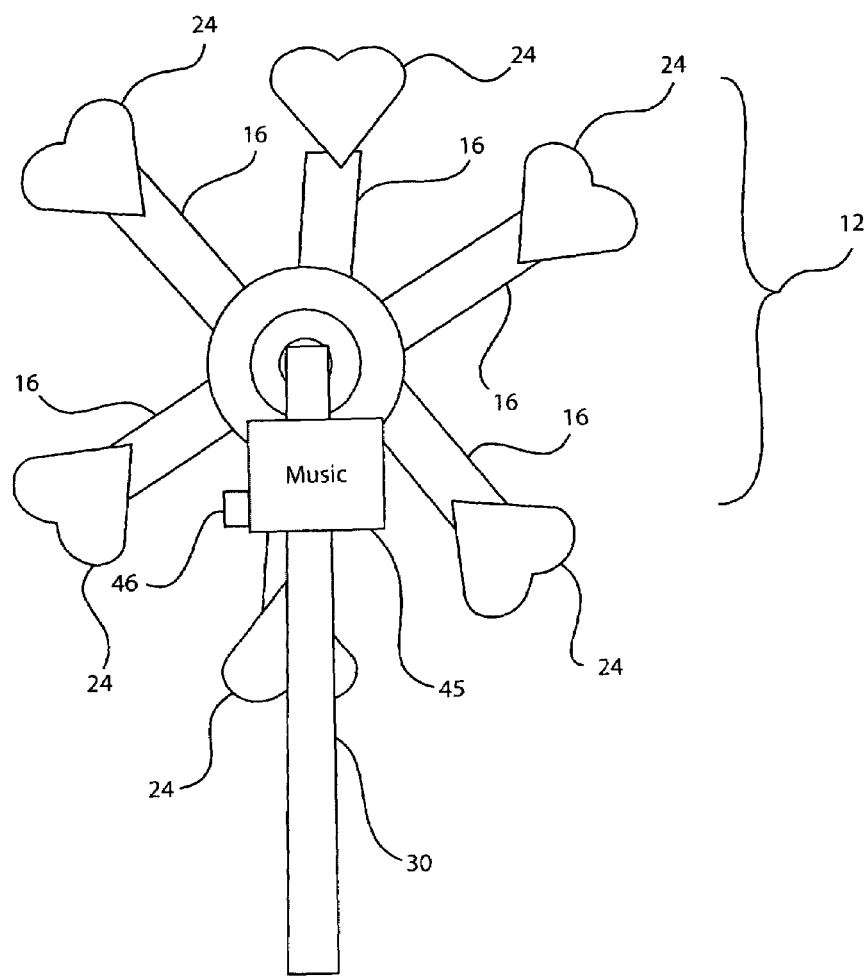
FIG. 6 is an exemplary embodiment showing a pinwheel having a sound or music-playing feature in accordance with the present invention.

Referring to FIG. 6, in another embodiment, a music device 45 may be included. Music device 45 may work independently of motion of pinwheel portion 12 or may be activated when pinwheel portion 12 is in motion. Music device 45 may include a separate power supply 46 or may employ the motion of pinwheel portion 12 to turn a scroll or other mechanism to enable musical sounds.

Figure 7:
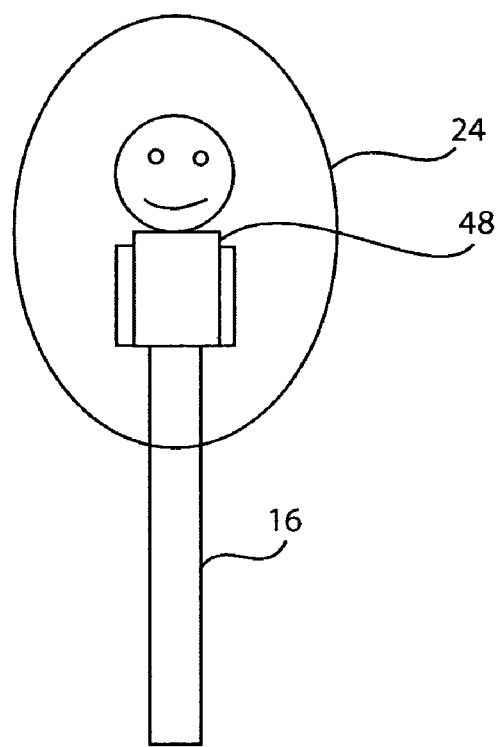
FIG. 7 shows greater detail for an exemplary spoke or blade having a three-dimensional novelty structure in accordance with the present invention.

Referring to FIG. 7, an illustrative spoke/blade 16 is shown having a candy item 24 formed thereon. Spoke 16 may include a molded FIG. 48 formed from plastic or other material. Candy item 24 may then be molded over FIG. 48. FIG. 48 may include character or characters from, for example, a movie, a comic or storybook, superhero, villain etc. Each spoke may have the same FIG. 48 or each FIG. 48 on a given pinwheel portion 12 may be different. Candy item 24 may be clear, translucent or opaque, and may include a plurality of different flavors or colors.

Figure 8:
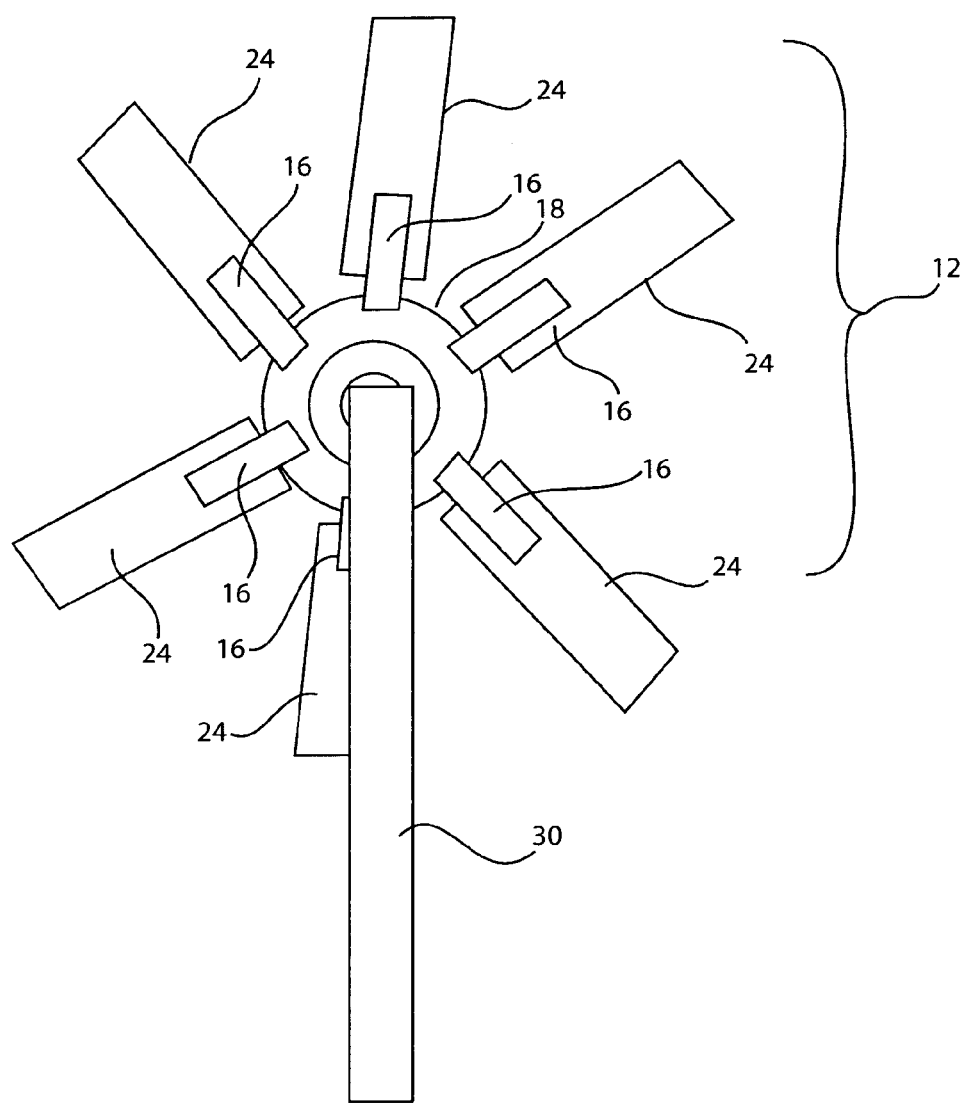
FIG. 8 is an exemplary embodiment showing candy items forming a functional portion of a pinwheel blade in accordance with the present invention.

Referring to FIG. 8, candy item 24 may form a portion of a blade along with spokes 16 and assist in transferring motion to the pinwheel portion 12 if placed into an air stream.

Figure 9A:
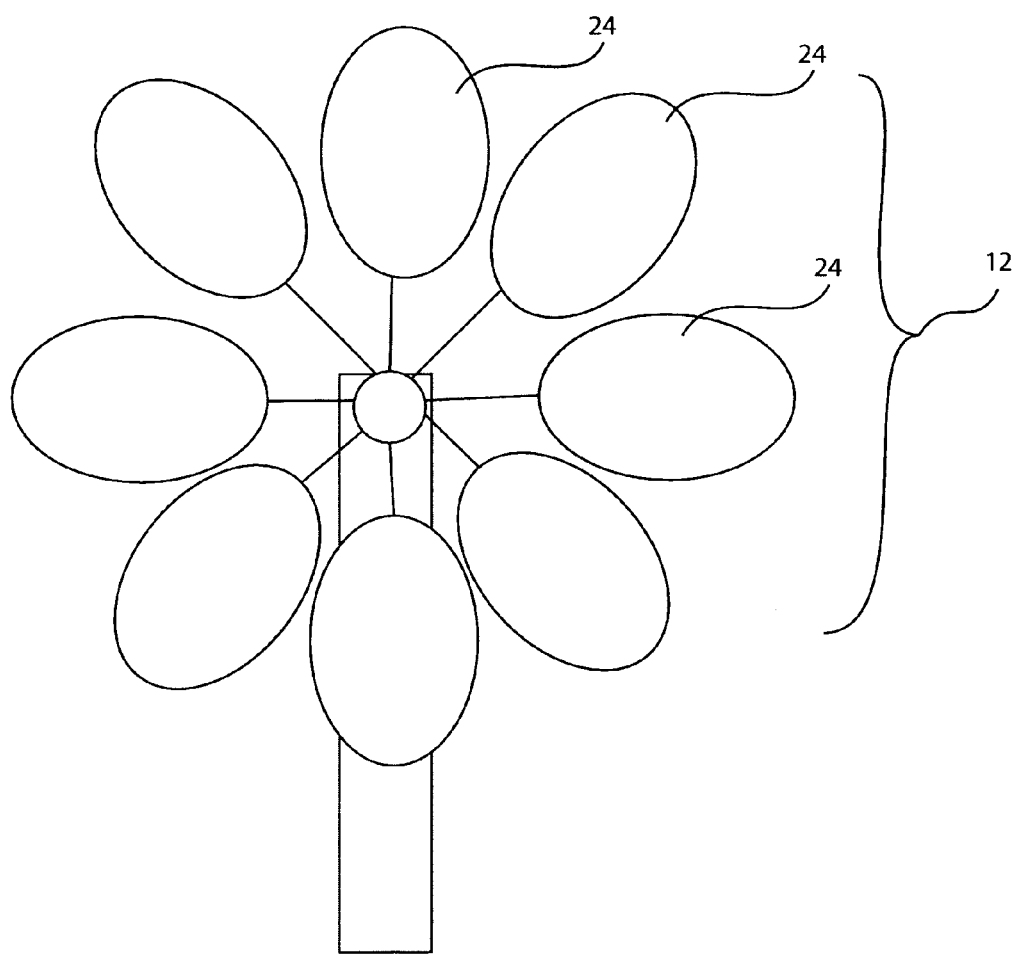
FIGS. 9A–C show illustrative forms of a pinwheel portion in accordance with the present invention.
Figure 9B:
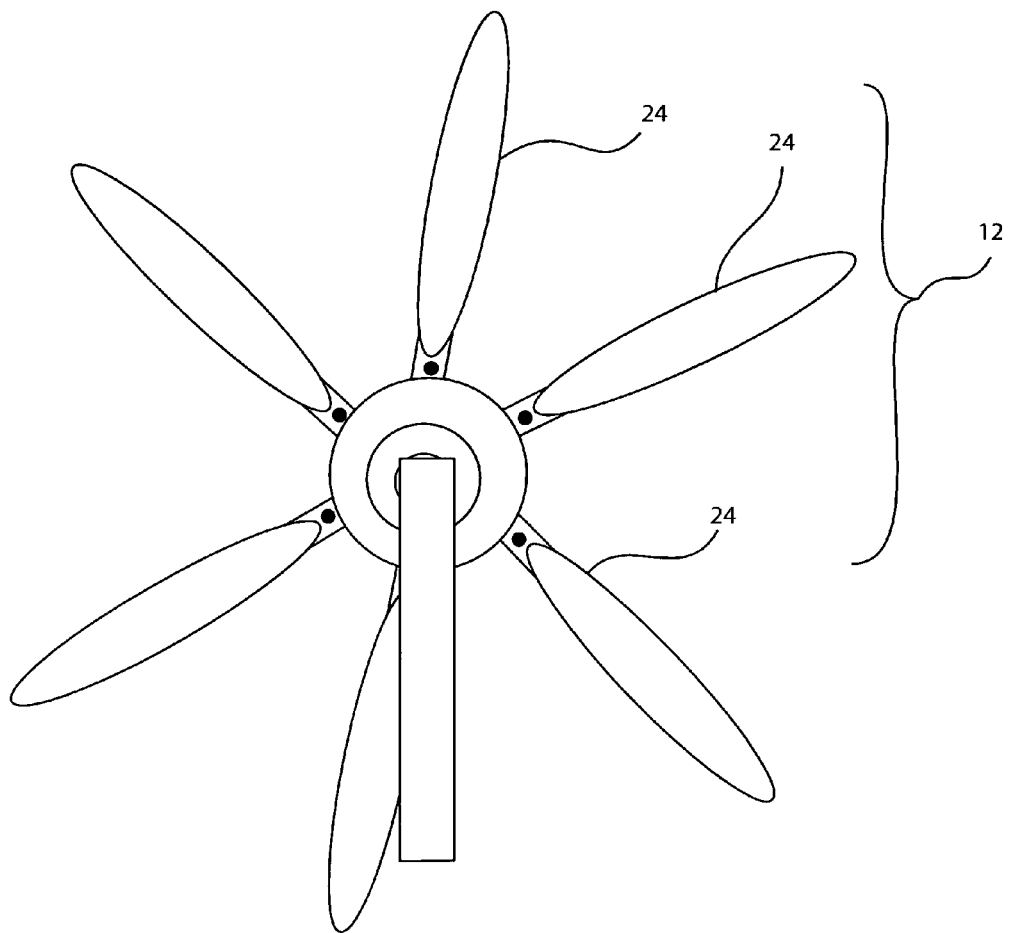
Figure 9C:
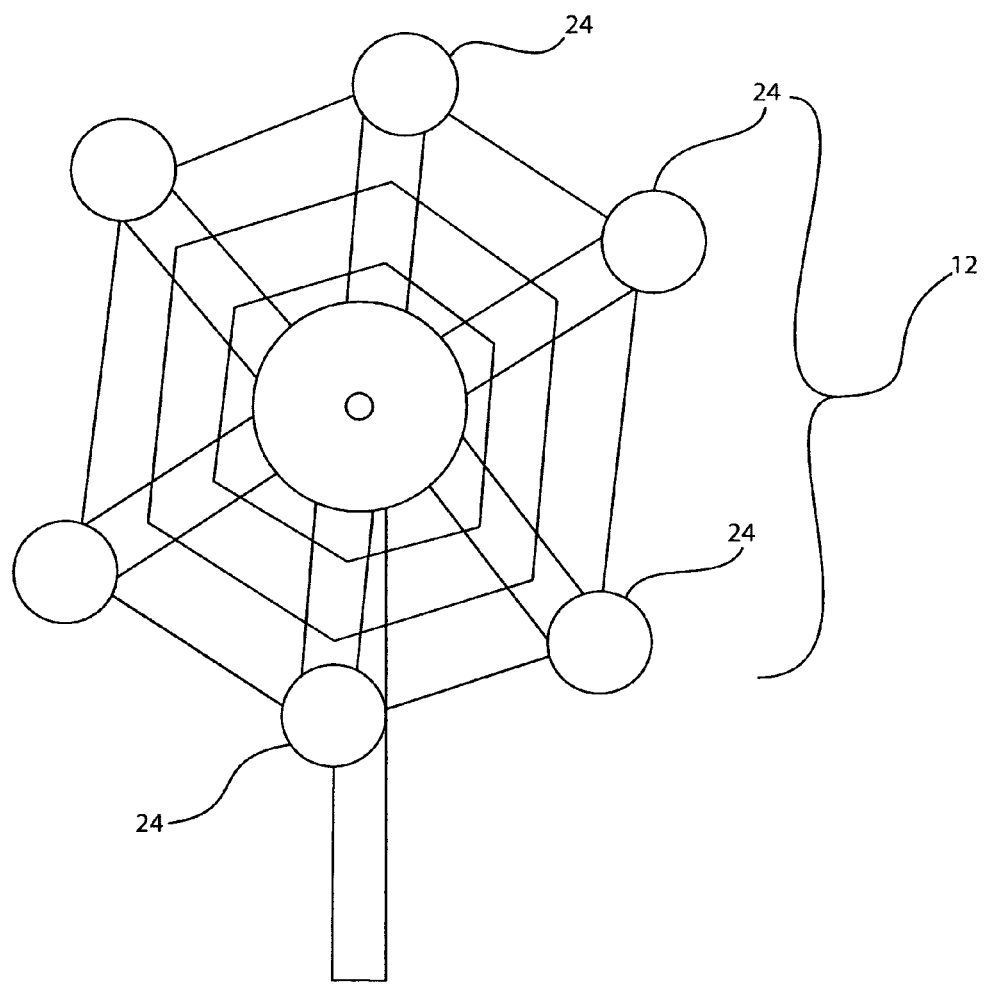

Referring to FIGS. 9A–C, pinwheel portion 12 may include a plurality of different shapes or features. In one embodiment, pinwheel portion 12 with candy items 24 appears in the form of a flower (FIG. 9A). In another embodiment, pinwheel portion 12 with candy items 24 appears as a ship or boat propeller (FIG. 9B). In still other embodiments, pinwheel portion 12 with candy items 24 appears in the form of a spider web (FIG. 9C), where web materials may be edible or molded materials, such as plastic. Other embodiments may include forms of an animal, person or any other image or structure.

Figure 10:
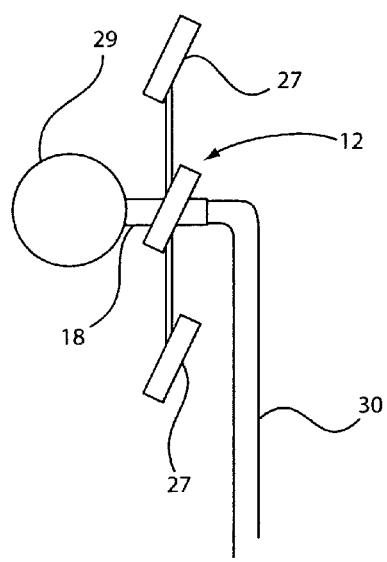
FIG. 10 shows an illustrative embodiment wherein in candy spins with a hub and blades include a non-edible material in accordance with the present invention.

Referring to FIGS. 10, fan blades 27 may be employed to provide motion to pinwheel portion 12. Blades may include, for example, a candy or other formable or moldable material such as plastic or wood. Spokes 16 connect to a hub 18, which rotates to also spin candy 29. Alternately, candy 29 may remain fixed during rotation of pinwheel portion 12.

Figure 11:
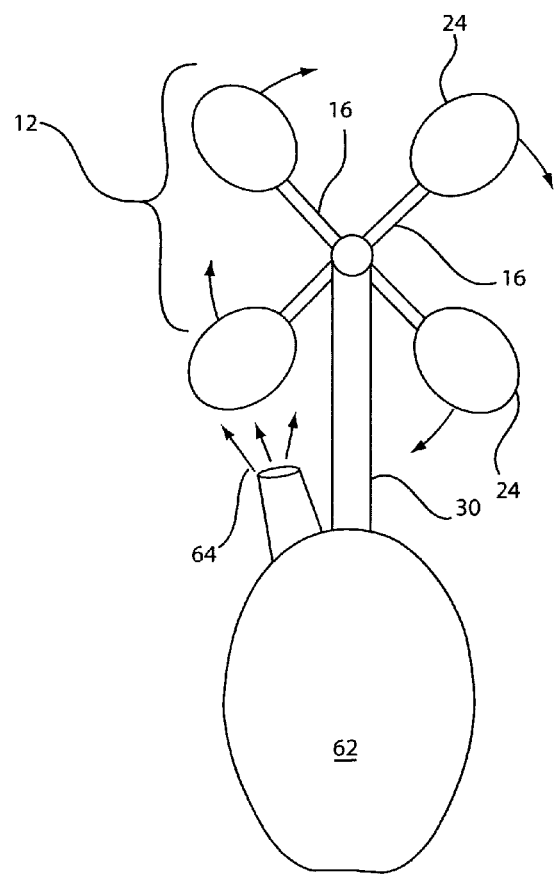
FIG. 11 shows an illustrative embodiment with a device for supplying an air stream in accordance with the present invention.

Referring to FIG. 11, an air blower 62 is provided on platform 30 to provide an air stream 64 for rotating pinwheel portion 12. Blower 62 may include a squeeze pump, a powered rotary fan or other blower device. Air stream 64 causes pinwheel portion 12 to rotate.

Figure 12:
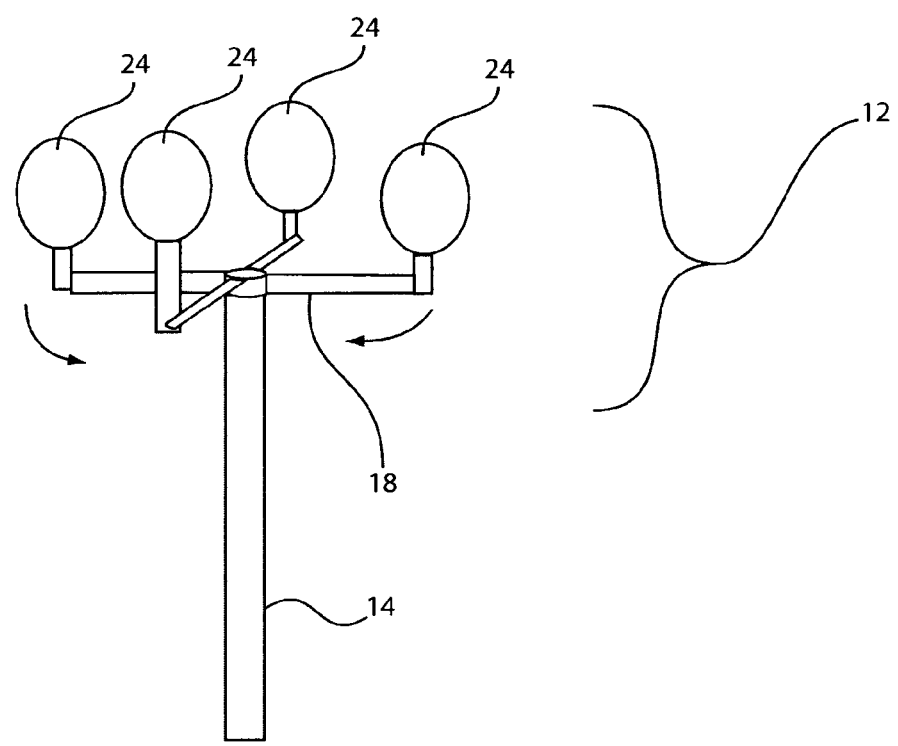
FIG. 12 shows a pinwheel or carousel portion, which may be employed in another embodiment of the present invention.

Referring to FIG. 12, hub 18 may be oriented in a vertical, horizontal or an angular direction. In the illustrative drawing shown in FIG. 12, hub 18 rotates in a horizontal plane, where candy items 24 function as fan blades to provide motion in an air stream.

Figure 13:
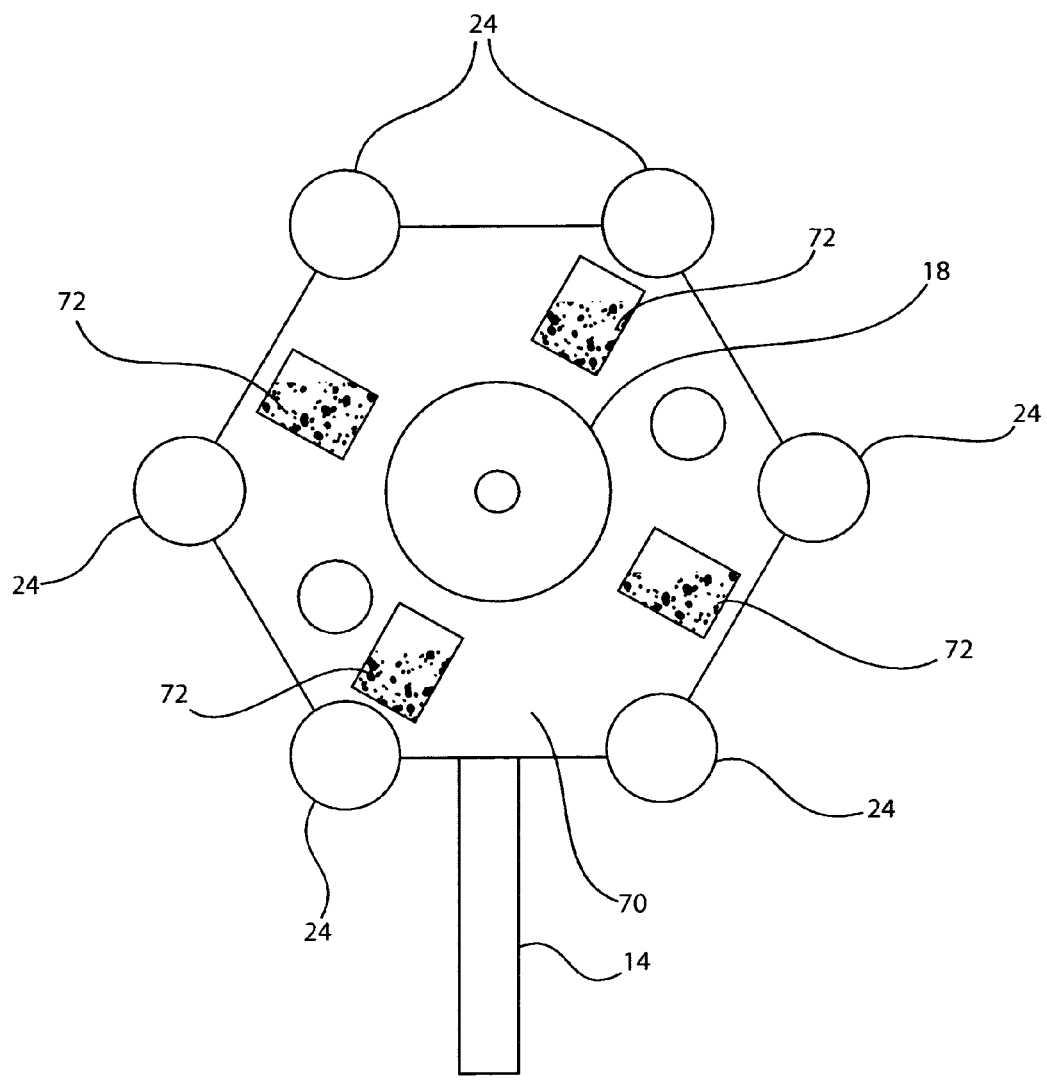
FIG. 13 shows an illustrative embodiment with a disk pinwheel in accordance with the present invention.

Referring to FIG. 13, hub 18 may include a disk 70. Disk 70 may provide the function of angled blades by providing angled portions 72 formed in disk 70. Angled portions 72 may include holes through disk 70 having an angled flap for catching the wind and diverting it to cause motion. Disk 70 may be employed in addition to or instead of spokes or blades 16. Candy items 24 may be attached anywhere on disk 70. Disk 70 can be designed to act as a turbine and transfer the kinetic energy of the wind.

Having described preferred embodiments for pinwheel lollipop (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A pinwheel comprising:
   a first axis, which supports a hub;
   a plurality of protrusions connected to the hub and radially extending therefrom;
   candy items attached to a plurality of the protrusions;
   a handle disposed substantially transverse to the first axis to permit the hub, plurality of protrusions and the candy items to rotate about the first axis; and
   a ratchet mechanism, which holds the hub in a position.

2. The pinwheel as recited in claim 1, wherein the hub is formed into a figure or promotional item.

3. The pinwheel as recited in claim 1, wherein the hub includes a detachable figure or promotional item.

4. The pinwheel as recited in claim 1, wherein the first axis is provided by an axel connected to a platform to permit rotation about the first axis.

5. The pinwheel as recited in claim 4, further comprising a light connected to the platform for illuminating the hub and the candy items.

6. The pinwheel as recited in claim 1, wherein the protrusions form blades, which spin the hub when the blades are placed in an air stream.

7. The pinwheel as recited in claim 1, further comprising a motor for spinning the hub.

8. The pinwheel as recited in claim 1, further comprising a finger driven mechanism for spinning the hub.

9. The pinwheel as recited in claim 1, further comprising an illumination feature on one of the hub and the protrusions to provide a light effect.

10. The pinwheel as recited in claim 9, wherein the illumination feature includes one of a light and a reflector.

11. The pinwheel as recited in claim 1, further comprising a sound device, which plays sounds in accordance with motion of the hub.

12. The pinwheel as recited in claim 1, wherein the candy item includes a lollipop.

13. The pinwheel as recited in claim 1, wherein the protrusions include candy items having different flavors or colors.

14. The pinwheel as recited in claim 1, wherein the protrusions include adjustable fan blades to permit a change in an angle relative to a central axis of a respective blade.

15. A pinwheel lollipop, comprising:
   a hub having a plurality of spokes extending radially therefrom, each spoke comprising a candy item molded thereon;
   the spokes forming blades for diverting air in an airstreams such that when placed in an airstreams the hub, spokes and candy items rotate relative to an axis which supports the hub; and
   a ratchet mechanism, which holds the hub in a position.

16. The pinwheel lollipop as recited in claim 15, wherein the hub is formed into a figure or promotional item.

17. The pinwheel lollipop as recited in claim 15, wherein the hub includes a detachable figure or promotional item.

18. The pinwheel lollipop as recited in claim 15, wherein the spokes include adjustable fan blades to permit a change in an angle relative to a central axis of a respective blade.

19. The pinwheel lollipop as recited in claim 15, further comprising a light for illuminating the hub and the candy items.

20. The pinwheel lollipop as recited in claim 15, further comprising a motor for spinning the hub.

21. The pinwheel lollipop as recited in claim 15, further comprising a finger driven mechanism for spinning the hub.

22. The pinwheel lollipop as recited in claim 15, further comprising an illumination feature on one of the hub and the protrusions to provide a light effect.

23. The pinwheel lollipop as recited in claim 22, wherein the illumination feature includes one of a light and a reflector.

24. The pinwheel as recited in claim 15, further comprising a sound device, which plays sounds in accordance with motion of the hub.

25. The pinwheel as recited in claim 15, wherein the candy items have different flavors or colors on each spoke.

26. A pinwheel comprising:
   a first axis, which supports a movable hub;
   a plurality of protrusions connected to the hub and radially extending therefrom;
   candy items attached to a plurality of the protrusions; and
   a ratchet mechanism, which holds the hub in a position.

* * * * *